March 12, 1963   L. J. NASH   3,080,838
MACHINE FOR FORMING METAL SECTIONS OR TUBES
Filed July 7, 1961   2 Sheets-Sheet 1

United States Patent Office 3,080,838
Patented Mar. 12, 1963

3,080,838
MACHINE FOR FORMING METAL SECTIONS
OR TUBES
Leonard James Nash, West Bromwich, England, assignor to Godins "The Rollers of Steel Sections" Limited, Newport, England
Filed July 7, 1961, Ser. No. 122,451
3 Claims. (Cl. 113—1)

This invention relates to a machine for forming metal sections or tubes and of the kind in which a plurality of operating units are mounted in a line upon a base for successive operation upon the work piece, each unit comprising a pair, or set, of rollers between the nip of which the work pieces are intended to be fed.

In such machines it is usual for at least one roller of each unit to be driven from a common driving shaft with the result that the mean peripheral speeds of the rollers are not easily adjustable. This means that undesirable tension or compression may be imparted to a work piece as it passes between adjacent units with resulting damage to the work piece, rollers or the machine.

The object of the invention is to overcome this disadvantage in a convenient manner and in accordance therewith each unit has a separate hydraulic motor for driving its roller or rollers, the plurality of hydraulic motors being connected to a common source of hydraulic power.

One particular and at present preferred form of the invention is illustrated in the accompanying drawings in which.

Figure 2:
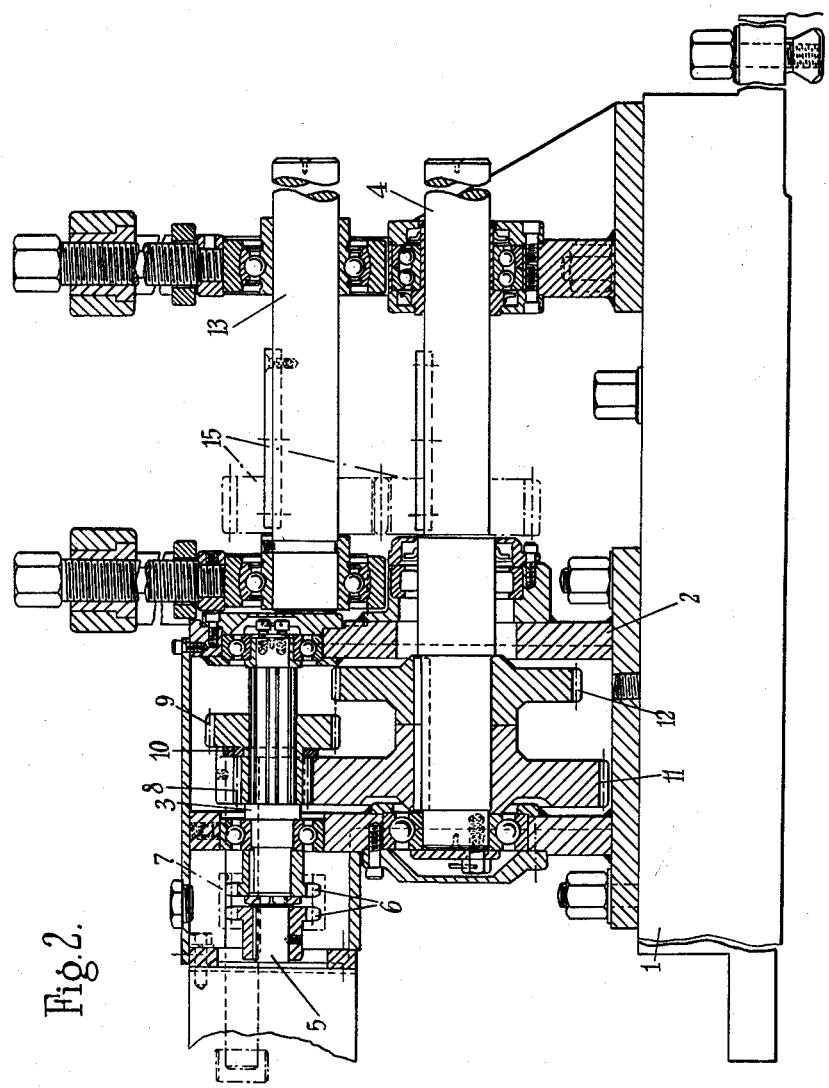
FIGURE 2 is a transverse vertical section through a typical operating unit shown in FIGURE 1.

Referring now to the drawings, the machine comprises a plurality of operating units A mounted in line at longitudinally spaced intervals upon a common base 1 for performing successive forming operations on a strip metal or other work piece fed longitudinally through them. Each unit, as shown in FIGURE 2, comprises a body part in which a pair of parallel shafts 3, 4 are mounted in bearings one above the other transversely of the base 1. Co-axial with the upper shaft 3 is an input shaft 5 which is rotatable by an hydraulic motor (not shown). The adjacent ends of shafts 3 and shaft 5 carry sprockets 6 which are drivingly coupled together by a duplex chain 7. Slidably mounted upon the splined inward end of shaft 3 are two small spur gears 8, 9 of differing diameters. These spur gears are separated by a clutch fork 10 by means of which they may be moved between two alternative positions in one of which, as shown, the smaller spur wheel 8 is engaged with a spur gear 11 on shaft 4 and in the other of which the larger spur wheel 9 is engaged with spur gear 12 on shaft 4. A further shaft 13 is mounted above and parallel with an extension of shaft 4 and these shafts carry a pair of rollers which co-operate to effect a forming operation on the work piece fed between them. Mounted on the latter shafts, adjacent the rollers (not shown), are a pair of meshing spur gears 15 to enable the top roller shaft 13 to be positively rotated.

Figure 1:
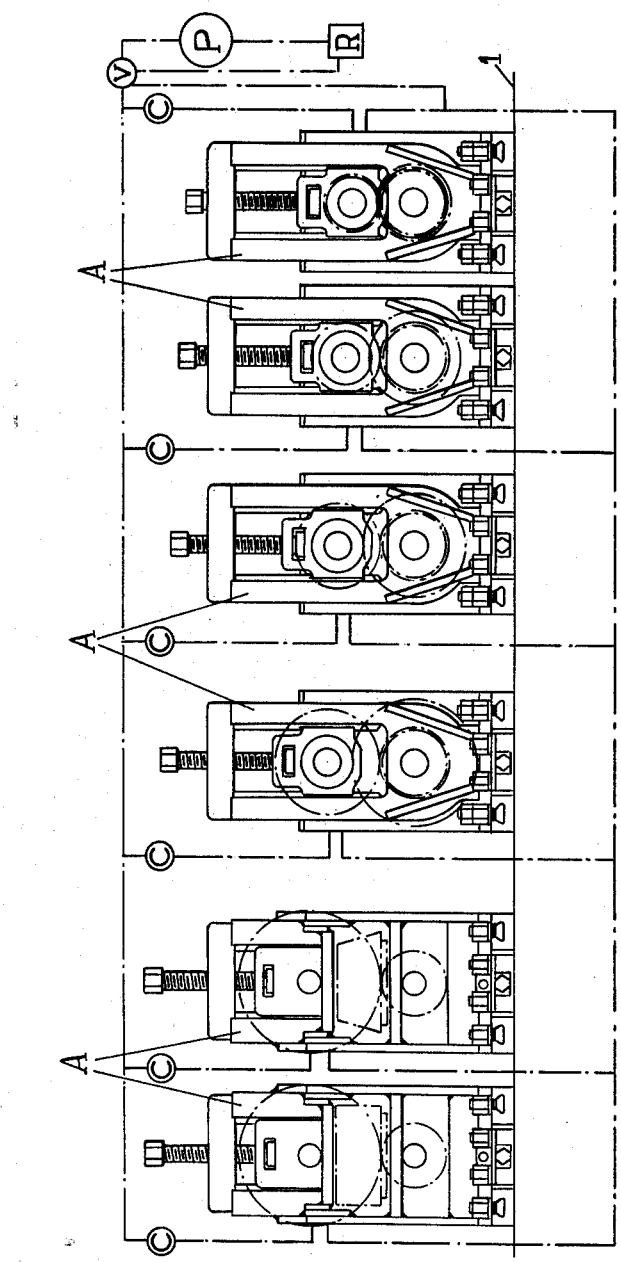
FIGURE 1 is a side elevation of a section forming machine.

Each unit A shown in FIGURE 1 has a separate hydraulic motor and the hydraulic motors of the plurality of units are connected through flexible piping B to an electrically or otherwise driven hydraulic pump P in a circuit including a reservoir R, main valve V and individual control valves C as diagrammatically illustrated in FIGURE 1.

Each body part 2 is individually adjustable on the base 1 in vertical, transverse and longitudinal directions. Each unit can be engaged to, or disengaged from, the common source of hydraulic power by manipulation of the appropriate valve C. Moreover, the upper roller of each unit is adjustable vertically relative to the lower roller so as to admit of their operation upon work pieces of varying cross-sectional profile.

The pitch diameters of the spur gears 15 are such as to allow fractional adjustment in this way but a radical difference in the diameters of the rollers would necessitate changing the spur gears.

By virtue of the fluid actuation of the plurality of motors the mean peripheral speeds of the rollers in the several units in use are equal irrespective of variations in the diameter or profile of the rollers from unit to unit. Thus damage to the work piece, the rollers, or the machine, caused by relative slip between work piece and any roller, is obviated and undesirable tension or compression in the parts of the work piece between adjacent units is avoided. Moreover, by volumetric control of the hydraulic fluid in a common portion of the supply piping to the several motors, an overall control of the speed of traverse of the work pieces can be achieved and accurate inching of the work pieces can be effected in either a forward or reverse direction.

Each unit is adjustable longtudinally and transversely of the base of the machine and is also adjustably movable upon a vertical axis relative to the base.

The machine as above particularly described, may be associated with means for cutting off lengths of the work piece as it issues from the machine to form sections or tubes of a required length, and also with means for performing punching or other pressing operations upon the work piece, prior to its detachment from the machine.

In such apparatus a hydraulic press, or presses, for effecting the pressing operation would be situated at either the feeding or the discharge end, whilst at the discharge end of the machine there could be an hydraulic actuated mechanism for cutting off successive sections or tubes from the work piece issuing from the machine, whilst the machine is in continuous or intermittent operation, as determined by suitable control valves and electrical switches. The hydraulic power for these machines and mechanisms may be supplied from a common source.

Thus a formed portion of the work piece could be cut off to a required length to constitute a section or tube whilst another portion of the work piece is being punched either preparatory to its introduction to or after discharge from the machine.

I claim:

1. A machine for forming metal sections or tubes comprising a plurality of operating units mounted in a line upon a base for successive operation upon a workpiece, each unit comprising a pair of rollers between the nip of which the workpiece is intended to be fed, a plurality of hydraulic motors individual to the operating units for driving at least one roller of each said operating unit at a speed which is controlled by the operation performed by said unit, the mean peripheral speeds of the rollers in the several operating units being thereby equalised, and an hydraulic pump for driving all the hydraulic motors.

2. A machine for forming metal sections or tubes comprising a plurality of operating units mounted in a line upon a base for successive operation upon a workpiece, each unit comprising a pair of rollers between the nip of which the workpiece is intended to be fed, a plurality of hydraulic motors individual to the operating units for driving at least one roller of each said operating unit, an hydraulic pump, connected by flexible piping to the hydraulic motors, a main valve controlling flow from the hydraulic pump to all the said hydraulic motors and a series of individual control valves for controlling flow to the respective motors, the driven roller of each operating unit being rotated at a speed which is controlled by the operation performed by said unit, the mean peripheral speeds of the rollers in the several operating units being thereby equalised.

3. A machine as set forth in claim 1 in which at least one of said operating units has an upper input shaft coupled to its hydraulic motor and a lower parallel shaft driven by gearing from the input shaft and carrying the lower one of the rollers.

References Cited in the file of this patent
UNITED STATES PATENTS

| | | |
|---|---|---|
| 2,311,075 | O'Mallery | Feb. 16, 1943 |
| 2,321,486 | Holt | June 8, 1943 |
| 2,016,772 | Hornbostel | Jan. 16, 1962 |